March 22, 1960 W. D. CLARK, JR 2,929,921
CODE CONTROLLED COMMUNICATION SYSTEM
Filed Jan. 26, 1955
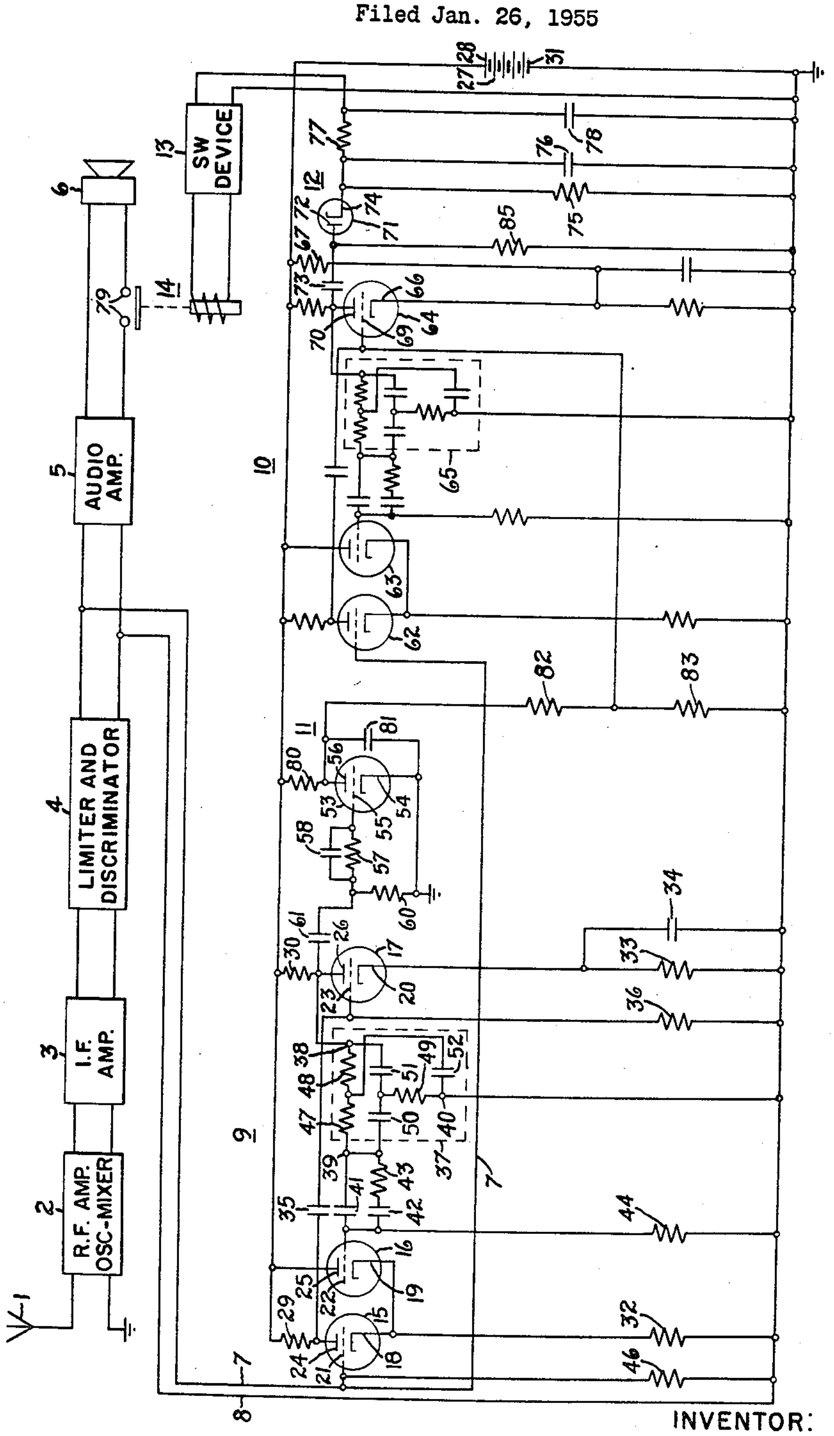
INVENTOR:
WELMON D. CLARK JR.,
BY Julius J. Zaskalicky
HIS ATTORNEY.

United States Patent Office 2,929,921

Patented Mar. 22, 1960

2,929,921

CODE CONTROLLED COMMUNICATION SYSTEM

Welmon D. Clark, Jr., Fulton, N.Y., assignor to General Electric Company, a corporation of New York Application January 26, 1955, Serial No. 484,289

6 Claims. (Cl. 250—2)

The present invention relates to pulse generation means and particularly to such means for use in communication systems in which means are employed to select a particular high frequency receiver to the exclusion of other receivers in the system.

An object of my invention is to provide improved means for effecting, from a transmitting station, the selection of a receiver with which that station is to communicate.

Another object of my invention is to provide means in each of the receiving stations in the system, all of which may operate on the same carrier frequency, to render the respective receiving station operative only in response to reception of a pair of waves of different frequencies to which only the respective receiving station responds. These waves may be received as modulation of the carrier wave first by one wave and then by the other for an instant prior to the desired communication.

A feature of my invention is means for gating said other wave only after cessation of said one wave.

In carrying this invention into effect there is provided in each of the receiving stations means for developing a voltage after cessation of the first of said received waves, and another means responsive to this voltage and to the second wave of said waves to render a normally inoperative portion of the receiver operative, such means being of a character as to maintain it operative after said waves terminate.

In one form of the invention to be described, such means include a pair of selective amplifiers to the input of which said waves are applied. One amplifier is tuned to pass the first wave and the other amplifier is tuned to pass the second wave. The second amplifier is normally inoperative until voltage is received from the first amplifier after cessation of the first wave to render it operative to pass the second wave which is utilized to render the normally inoperative portion of the receiver operative.

The novel features which are believed to be characteristic of this invention are set forth with particularity in the appended claims. The invention itself, however, both as to its organization and method of operation, together with further objects and advantages thereof may best be understood by reference to the following description taken in connection with the accompanying drawing showing an embodiment of this invention as applied to a frequency modulation receiver.

The receiver comprises an antenna 1, a radio frequency amplifier-oscillator-mixer-stage 2, an intermediate frequency amplifier 3, a limiter and discriminator 4, an audio frequency amplifier 5, and a loudspeaker 6 connected together in that order.

The aforementioned waves are received at the output of the discriminator 4 and are applied over conductors 7 and 8 to the input of the selective amplifiers 9 and 10, respectively. Selective amplifier 9 is tuned to pass the first wave and reject other waves. Selective amplifier 10 is tuned to pass the second wave and reject others.

Selective amplifier 10 is further interconnected with selective amplifier 9 through gating means 11. The latter means renders selective amplifier 10, which is normally inoperative, operative for a predetermined time interval after the passage of the aforementioned first wave through the selective amplifier 9. Thus, the second wave having the frequency to which the second selective amplifier 10 is tuned and occurring within the predetermined interval after termination of the first wave is passed by the selective amplifier 10. A rectifier means 12 connected to the output of the second selective amplifier 10 rectifies the second wave. The rectified and filtered wave is applied to the switching device 13 to activate the relay 14, and thus, to render the audio channel of the aforementioned receiver operative.

Selective amplifier 9 comprises electron discharge devices 15, 16, and 17 including respective cathodes 18, 19, 20, respective grids 21, 22, 23, and respective anodes 24, 25, 26. These devices are supplied with unidirectional operating potential from source 27 having a positive terminal 28 connected to the anode 25 directly and to anodes 24 and 26 through resistances 29 and 30, respectively, and having a negative terminal 31 connected to cathodes 18 and 19 through resistance 32, and to cathode 20 through resistance 33 bypassed by bypass capacitor 34.

Electron discharge devices 15 and 16 function as an amplifier. Waves appearing across the resistance 29 are applied to electron discharge device 17 through a coupling capacitor 35 connected between anode 24 and grid 23. Grid leak resistance 36 is connected between grid 23 and ground.

The output from electron discharge device 17 is applied in degenerative phase to the amplifier comprising electron discharge devices 15 and 16 through filter network 37 having an input terminal 38, an output terminal 39, and a common terminal 40. The anode 26 of electron discharge amplifier 17 is connected to input terminal 38. Common input and output terminal 40 is connected to ground. The output terminal 39 of network 37 is connected through capacitor 41 shunted by series combination of capacitor 42 and resistance 43 to grid 22 of electron discharge device 16. Grid 22 is connected to ground through grid leak resistance 44, and grid 21 is connected to ground through grid leak resistance 46.

Network 37 comprises resistances 47, 48, and 49, and capacitances 50, 51, 52. Resistances 47 and 48 are connected in series between input and output terminals 38 and 39, respectively, and capacitor 52 is connected between the junction of these resistances and the common terminal 40. Capacitors 50 and 51 are connected in series between the input terminal and output terminals 38 and 39, respectively, and the junction of these capacitances is connected to ground through resistance 49. When the resistances and capacitances of the network are proportioned so that Resistance 47=resistance 48
Capacitance 50=capacitance 51
Capacitance 52=twice capacitance 50
Resistance 49=one-half resistance 47 the transmission characteristic of the network is such that at the center frequency determined by the relationship $$\text{Center frequency}=\frac{1}{2\pi\times\text{resistance }47\times\text{capacitance }50}$$

voltage waves applied between the input terminals 38, 40 are not transmitted to the output terminals 39, 40. However, at frequencies on either side of the center frequency, the transmission of waves increases with increase in departure from the center frequency. Thus, the feedback through the network 37 from electron discharge device 17 to the amplifier comprising electron discharge devices 15 and 16 is zero at the center frequency of the network and is degenerative at frequencies both above and below the center frequency. Accordingly, the electron discharge devices 15, 16, and 17 amplify the center frequency considerably more than frequencies on either side of the center frequency and thus the amplifier selectively passes the frequency to which the network is tuned.

The network comprising capacitors 41, 42 and resistance 43 is known as an "anti-thumping" network and functions to prevent self-oscillation of the amplifier at frequencies below the frequency of operation of the selective amplifier 9 and particularly at frequencies of the order of a few as for example, three cycles per second.

The output appearing across anode load resistance 30 is applied to the delayed gating circuit 11 which comprises an electron discharge device 53 including a cathode 54, a grid 55, and an anode 56. The delayed gating circuit 11 functions to develop an output pulse of voltage only after the cessation of the output appearing across anode load resistance 30. The output from the gating circuit 11 is then applied to the selective amplifier 10 to gate the latter into operation.

Hithertofore the voltage appearing across the anode load resistance 30 was rectified and concurrently with the occurrence thereof was applied to the selective amplifier 10. Such a circuit arrangement was susceptible to spurious signals during the occurrence of the first wave. Also, the variable voltage applied to the selective amplifier 10 caused a change in the Q or the selectivity of the amplifier thereby rendering the second selective amplifier even more susceptible to spurious actuation. The present circuit is directed to elimination of such difficulties. This circuit provides a substantially fixed bias voltage to render the selective amplifier 10 conductive only after the cessation of the signal appearing at the output of amplifier 9. Thus, the amplifier 10 is considerably less susceptible to spurious activation since it is not on at the same time as amplifier 9 and since the bias applied to it does not appreciably affect the selectivity of this amplifier.

Referring now to the details of the delayed gating circuit 11, cathode 54 is connected to ground, grid 55 is connected through the grid resistance 57 shunted by biasing capacitance 58 to the junction of coupling resistance 60 and coupling capacitor 61 to the anode 26. Resistor 60 also provides a D.-C. path to ground for grid 55 through resistor 57. The anode 56 is connected through anode load resistance 80 to the positive terminal 28. The anode 56 is also connected through output capacitance 81 to ground. Resistances 82 and 83 are connected in series between the anode 56 and ground. The junction of these resistances is connected to the grid 69 of device 64. In the absence of a signal applied at the selective amplifier 9, the grid 55 is biased near zero voltage causing conduction through device 53 thereby causing a drop in the voltage appearing at the anode 56 and hence across the capacitance 81. This voltage holds the device 64 cut off. When a signal is passed by selective amplifier 9 and applied to the grid 55, the latter draws grid current and thus develops a bias across capacitance 58 without appreciably affecting the conduction through the device 53. Thus, on the reception of signal, the device 64 is still maintained nonconductive. Upon cessation of the output from selective amplifier 9 however, driving voltage no longer is applied to the grid 55 to cause conduction in the device 53 and the bias developed across capacitance 58 now causes the device 53 to become nonconductive thereby causing a rise in potential at anode 56 and hence, across the capacitance 81. The rise in voltage across capacitance 81 causes an increase in the voltage applied to grid 69 thereby rendering device 64 conductive. Device 64 remains conductive until the bias developed across capacitance 58 decays through resistance 57 to a sufficient value to again cause device 53 to conduct at which time the voltage across capacitance 81 is caused to drop thereby rendering device 64 nonconductive. Thus, a means has been provided for rendering the selective amplifier 10 conductive only after the cessation of the signal appearing at the output of selective amplifier 9. Further, the delayed gating circuit 11 provides a substantially fixed output voltage as well as a sudden rise in voltage to this fixed output voltage to render the amplifier 10 conductive. The various biases for the amplifier 10 can accordingly be selected to give the desired operating characteristic. Preferably, the time constant of the network comprising resistance 57 and capacitance 58 is selected to be approximately equal to the "signal on" time desired at the selective amplifier 10. The time constant of the network comprising resistance 80 and capacitance 81 has negligible effect on gating time of amplifier 10. This time constant is such as to prevent the D.-C. voltage at anode 56 from rising substantially during the time that signal is being applied to grid 55.

Selective amplifier 10 includes electron discharge devices 62, 63, and 64 having their discharge paths energized from the source of operating potential 27. Selective amplifier 10 is substantially identical to selective amplifier 9 except that the network 65 corresponding to network 37 of amplifier 9 is tuned to pass a different frequency and that device 64 corresponding to device 17 of selective amplifier 9 is maintained nonconductive until rendered conductive by a voltage obtained from gating circuit 11 as pointed out above. The device 64 is maintained nonconductive by a positive bias voltage applied to cathode 66 of device 64 through resistance 67 connected between the cathode 66 and positive terminal 28 of source 27. This positive bias voltage is overcome by the voltage applied from gating circuit 11 to grid 69 of device 64.

The output appearing at anode 70 of device 64 is applied to rectifier 12, including a unilaterally conducting device 71 having an anode 72 connected through coupling capacitor 73 to anode 70 and a cathode 74 connected through resistance 75 shunted by capacitor 76 to ground. D.-C. return for unilateral conducting device 71 is through resistor 85 to ground. The voltage appearing across capacitor 76 is integrated by means of integration network comprising resistance 77 and capacitance 78 connected in series between cathode 74 and ground.

The voltage appearing across capacitance 78 is applied to switching device 13 to render the relay 14 operative to close the contacts 79 thereof, thereby connecting the loudspeaker 6 to the audio amplifier 5. Switching device 13 may be any device which develops an energizing voltage in response to a momentary impulse voltage of predetermined amplitude. It may for example include various gaseous discharge device circuits.

After termination of communication with the receiver, the loudspeaker 6 may be disconnected from the audio amplifier by interrupting the current flow to the relay 14, thereby readying the receiver for another communication which may be directed to it.

As pointed out above, the selective calling signal comprises a carrier wave modulated momentarily first by one wave having one frequency and after a short interval by another wave having another frequency. In actual operation it has been found satisfactory to make the duration of the first wave about 0.3 of a second and to make the duration of the second wave about 0.5 of a second, the latter wave beginning about 10 microseconds after termination of the first wave. To call a particular receiver, the frequency of the first wave is selected to be the frequency to which selective amplifier 9 is tuned and the frequency of the second wave is selected to be the frequency to which the selective amplifier 10 is tuned. The selective amplifier 9 passes the first wave which is then applied to the delayed gating circuit 11. The output from the delayed gating circuit 11 is applied to selective amplifier 10 to render the latter operative to pass the second wave. The output from the selective amplifier 10 is rectified, integrated by resistance 77 and capacitance 78, and then applied to switching device 13 to activate the audio channel of the receiver. The integrating network 77, 78 delays the buildup of voltage applied to device 13 to actuate the latter. With this provision the possibility of spurious waves actuating the device 13 is minimized.

While I have shown a particular embodiment of my invention, it will, of course, be understood that I do not wish to be limited thereto since many modifications both in the circuit arrangement and in the instrumentalities employed may be made, and I therefore contemplate by the appended claims to cover any such modifications that come within the true spirit and scope of my invention.

What I claim as new and desire to secure by Letters Patent of the United States is:

1. The combination in a high frequency receiver having a normally operative portion and a normally inoperative portion, means responsive to a wave in said operative portion for initiating a control pulse after the cessation of said wave, and means responsive to said control pulse and a second wave in the said operative portion occurring during the occurrence of said pulse for rendering said normally inoperative portion operative.

2. The combination in a high frequency receiver having a normally inoperative portion and a normally operative portion carrying a high frequency wave modulated in sequence by two low frequency waves, a selective means adapted for passing the first of said low frequency waves coupled to said normally operative portion, another selective means adapted for passing the second of said low frequency waves coupled to said normally operative portion, means responsive to the cessation of the first of said low frequency waves for rendering said second selective means operative for a predetermined interval to pass said other low frequency wave, and means responsive to said second low frequency wave for rendering said normally inoperative portion operative.

3. The combination in a high frequency receiver having a normally inoperative portion and a normally operative portion carrying a high frequency wave modulated in sequence by two low frequency waves, a selective filter means adapted for passing only the first of said low frequency waves, another filter means adapted for passing only a second of said low frequency waves, said other filter means being normally inoperative for passing the second of said low frequency waves, means for applying said modulated waves to each of said filter means, means connected to the output of said one filter means and responsive to the first of said low frequency waves for initiating a pulse of voltage after the cessation of said first of said low frequency waves for rendering said other filter means operative for passing the second of said low frequency waves, and means responsive to the second of said normally inoperative waves for rendering said low frequency portion operative.

4. In combination, a receiver adapted to be actuated by a plurality of waves occurring in time sequence and having a normally operative portion and a normally inoperative portion, means responsive to the termination of one of said waves in said normally operative portion for developing a control pulse, and means responsive to said control pulse and the next succeeding wave of said plurality of waves for rendering said normally inoperative portion operative.

5. In combination, a receiver adapted to be actuated by a high frequency wave modulated in sequence by a plurality of waves and having a normally operative portion and a normally inoperative portion, means connected to said normally operative portion responsive to the first of said plurality of waves for initiating a pulse of voltage after the cessation of said first of said plurality of waves, a normally inoperative means connected to said normally operative portion responsive to the second of said plurality of waves when activated for producing a second pulse of voltage, means for applying said pulse of voltage to said normally inoperative means to activate said normally inoperative means during the occurrence of said second plurality of waves, and means for applying said second pulse of voltage to the operative portion of said receiver to render said receiver completely operative.

6. In a signal responsive device having a normally operative portion and a normally inoperative portion, means responsive to a first signal in said operative portion for initiating a control signal after the cessation of said first signal, and means responsive to said control signal and a second signal in said operative portion for rendering said normally inoperative portion operative.

References Cited in the file of this patent

UNITED STATES PATENTS

| | | |
|---|---|---|
| 2,141,551 | Phinney et al. | Dec. 27, 1938 |
| 2,325,829 | Boswau | Aug. 3, 1943 |
| 2,486,154 | Hadfield | Oct. 25, 1949 |
| 2,499,234 | Tourshou | Feb. 28, 1950 |
| 2,523,315 | Mayle | Sept. 26, 1950 |
| 2,630,525 | Tomberlin et al. | Mar. 3, 1953 |
| 2,724,049 | Rouault | Nov. 15, 1955 |

OTHER REFERENCES

Terman: "Radio Engineering," McGraw-Hill, 3rd Ed., pp. 515 to 517.